US005375949A

United States Patent [19]
McHenry, Jr.

[11] Patent Number: 5,375,949
[45] Date of Patent: Dec. 27, 1994

[54] DEVICE AND METHOD FOR FORMING THE S-VIDEO RECORD ENABLE I.D. HOLE IN VIDEOCASSETTES

[76] Inventor: David C. McHenry, Jr., 3382 Border Dr., Stone Mountain, Ga. 30087

[21] Appl. No.: 119,340

[22] Filed: Sep. 9, 1993

[51] Int. Cl.$^5$ ............................................. B23B 35/00
[52] U.S. Cl. ................... 408/1 R; 408/72 B; 408/115 B
[58] Field of Search ........... 408/1 R, 72 B, 97, 115 B, 408/115 R, 202, 241 S

[56] References Cited

U.S. PATENT DOCUMENTS

| | | | |
|---|---|---|---|
| 3,046,818 | 7/1962 | Iaha | 408/103 |
| 3,301,101 | 1/1967 | McEwen | 408/202 |
| 4,538,354 | 9/1985 | Inolik | 408/72 B |
| 5,126,908 | 6/1992 | Casari et al. | 360/137 |

OTHER PUBLICATIONS

Ad & Instruction Sheet, LMT Marketing's Disk Double
Dave Spangler, Videomaker Magazine, The Hole Truthe p. 104 Aug. 1992.
Roderick Woodcock, Video Magazine, Q & A Column, Feb. 1993 p. 32.
SMPTE Journal, Oct. 1992, Proposed Specification #32M p. 762.

Primary Examiner—Daniel W. Howell

[57] ABSTRACT

A device and method are disclosed for forming the S-video record enable I.D. hole in VHS, 8 mm and VHS-C videocassettes. Three specially adapted hole forming implements and their method of use are described. These implements are adapted to avoid forming loose debris from the hole forming process and to prevent such debris which is created from entering the cassette mechanism. The invention provides for automatic positioning of the hole forming implements and for control of their movement by use of positioning plates which are specially adapted to fit on the videocassettes in a singular and specific manner. The invention further provides for controlling the operation and movement of the hole forming implements by use of guide bushings which are integral to the positioning plates. The methods used for forming the hole include cutting, piercing and melting through the plastic cassette shell.

2 Claims, 3 Drawing Sheets

DEVICE AND METHOD FOR FORMING THE S-VIDEO RECORD ENABLE I.D. HOLE IN VIDEOCASSETTES

BACKGROUND AND SUMMARY OF THE INVENTION

The present invention relates in general to video cassette recorders and camcorders, which are hereafter referred to as VCRS, and to the videocassettes which these VCRs use for recording and playing back video and audio signals. More specifically the invention relates to VCRs which record and playback in the S-video mode. These S-video compatible VCRs can record in one or more of the standard formats which include VHS, 8 mm and VHS-C. The same S-video compatible VCRs also record and playback in one or more of the S-video modes which include SVHS, Hi8 mm and SVHS-C. Video signals recorded in the standard formats have a horizontal resolution of approximately 240 lines and are recorded as NTSC which is a composite signal where the luminance and chroma signals are combined. Video signals recorded in the S-video formats have a horizontal resolution of approximately 410 lines and are recorded as S-video signals where the luminance and chroma signals are recorded separately and carried on separate conductors. The S-video formats are superior to standard formats in video picture resolution and in signal degradation through successive editing and processing.

The VCR manufacturers who developed S-video format VCRs specified that S-video signals should be recorded on higher quality tape than the standard formats. To this end these same manufacturers designed the S-video VCRs to include a mechanical limit switch which detects the presence or absence of a record enable I.D. hole in the videocassette. Videocassettes which are sold as S-video compatible have an integrally molded the S-video record enable I.D. hole. When a videocassette that has the record enable I.D. h hole is loaded into a S-video compatible VCR the mechanical limit switch actuator pin goes into the same I.D. hole. The limit switch remains unactuated and the VCR's circuitry will allow recording in the S-video mode. Conversely if the I.D. hole is not present in the cassette the same limit switch is actuated when the cassette is loaded and S-video recording is not allowed by the VCR's circuitry.

People who use these S-video VCRs often purchase standard format cassettes (VHS, 8 mm or VHS-C) and add the S-video record enable I.D. hole to these same cassettes to allow these same cassettes to be recorded in the S-video mode (SVHS, Hi8 or SVHS-C). These same people are motivated do this for reasons of convenience and economy since S-video cassettes are less commonly available and more expensive. These same people consider the resulting videotape recordings generally acceptable for their intended use.

The practice of forming the S-video record enable I.D. hole in standard videocassettes by obvious and haphazard methods is inconvenient and inaccurate at best and hazardous at worst. The same practice is hazardous because lack of control may cause damage to the cassette and more importantly because debris which is created when forming the S-video record enable I.D. hole may be forced into the videocassette and ultimately come in harms way with regard to the video tape or the videocassette and VCR mechanisms.

An object of the present invention is to facilitate forming the S-Video record enable ID hole in standard videocassettes while avoiding damaging the cassette or letting loose debris enter the cassette. The present invention in its preferred embodiment can be used to form the S-video record enable hole in any VHS, 8 mm or VHS-C cassette. The same hole is formed by either cutting, piercing or melting through the plastic cassette casting.

A further object of the present invention is to provide accurate and automatic positioning for the hole forming implement when the same hole is being formed. This is accomplished by means of positioning plates one side of which fits to the videocassettes in a specific and singular way. One of these positioning plates is formed such that it provides said positioning for both VHS and 8 mm videocassettes. These same positioning plates contain guide bushings for properly positioning the hole forming implements while the holes are being formed. Said bushings are made of materials appropriate to the hole forming method employed and have a deliberately controlled length through the bore so as to control the depth to which the hole forming implement will penetrate the videocassette.

DESCRIPTION OF THE PREFERRED EMBODIMENT

Figure 1:
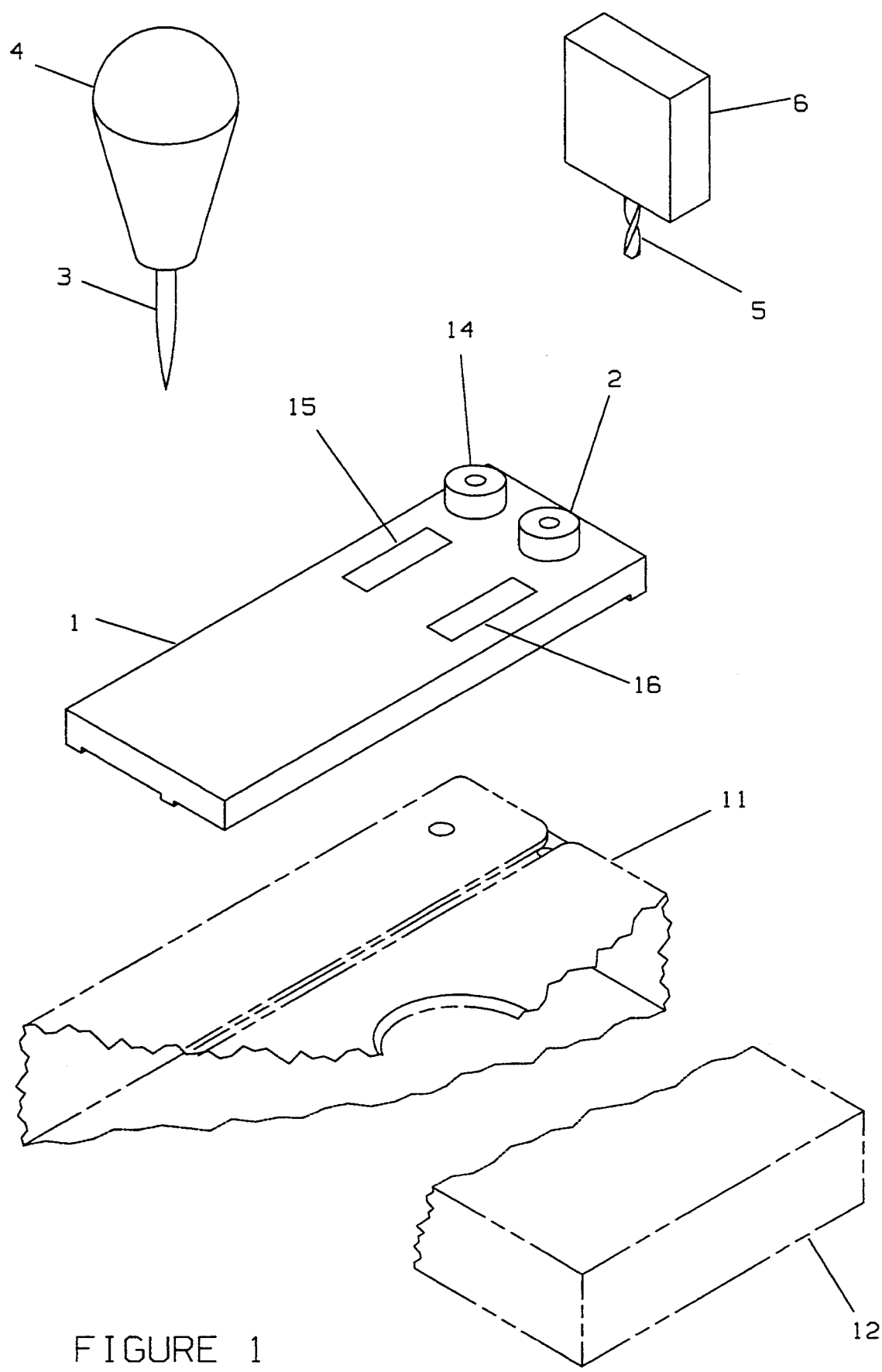
FIG. 1 is a diagrammatic view of the assembled parts of the hole making implements and positioning plate which is used for SVHS and Hi8 formats. The videocassettes appear as partial sections in this exploded isometric view.
Figure 2:
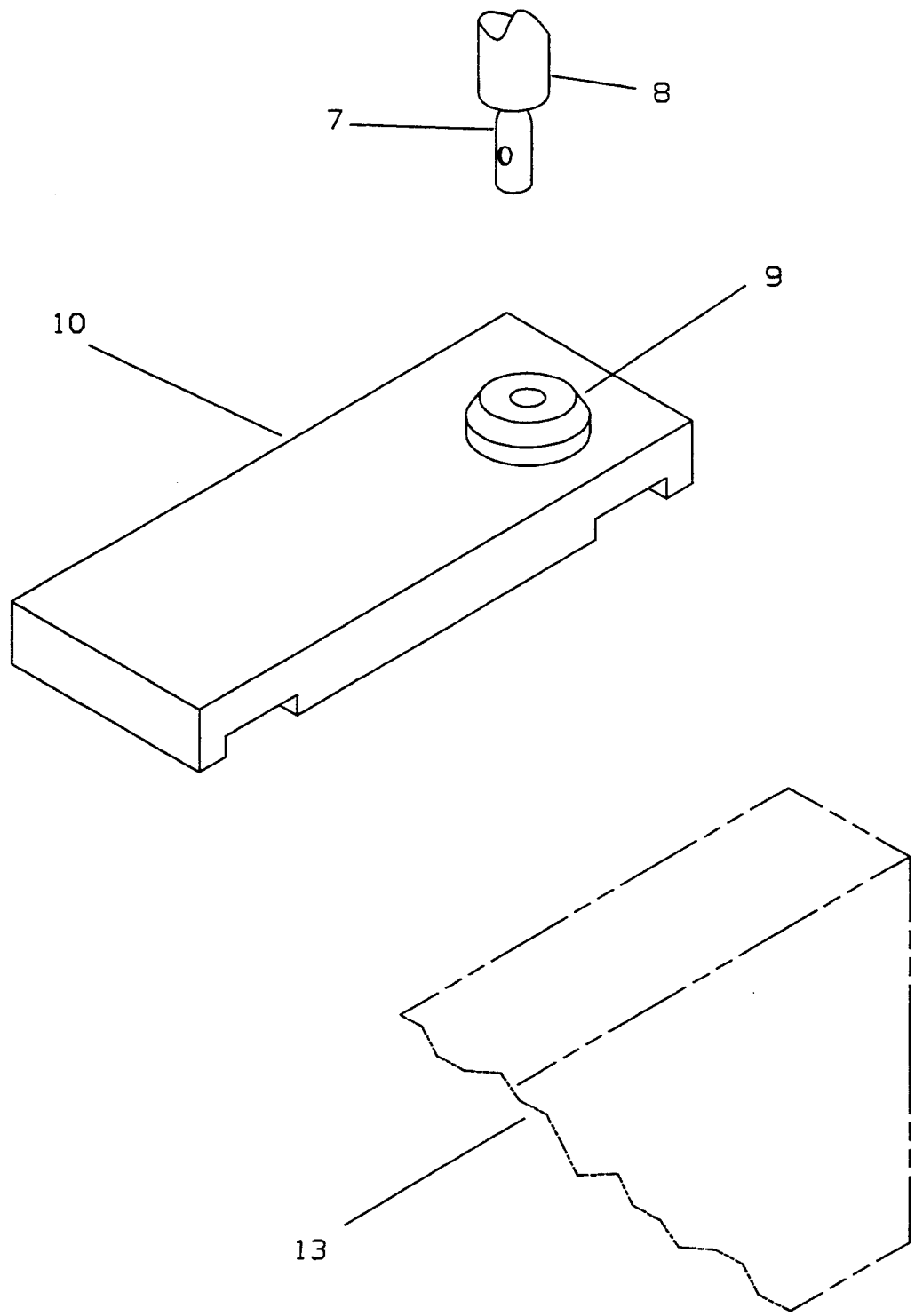
FIG. 2 is a diagrammatic view of the assembled parts of the hole making implement and positioning plate which is used for SVHS-C format. The videocassette appears as a partial section in this exploded isometric view.
Figure 3:
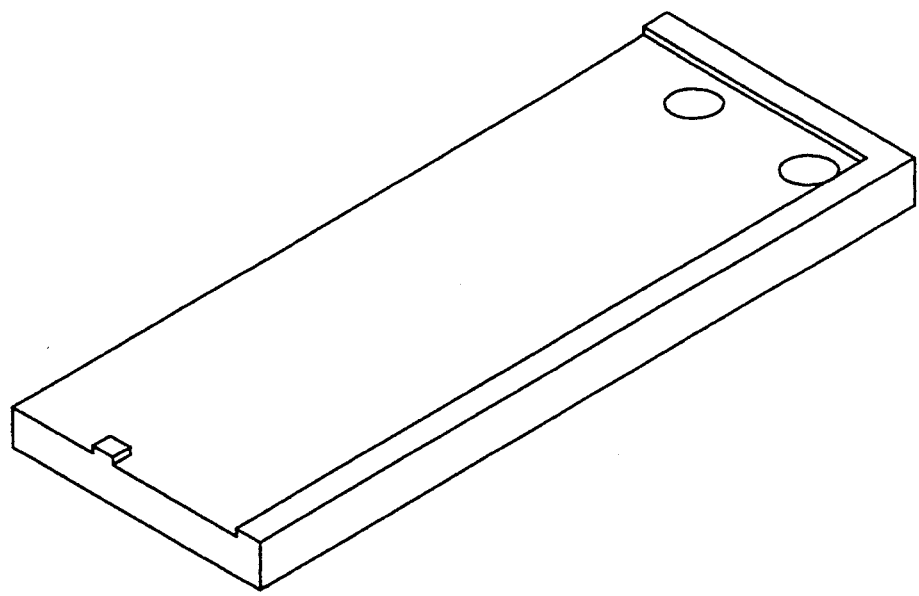
FIG. 3 is an isometric view of the lower side of the positioning plate shown in FIG. 1.
Figure 4:
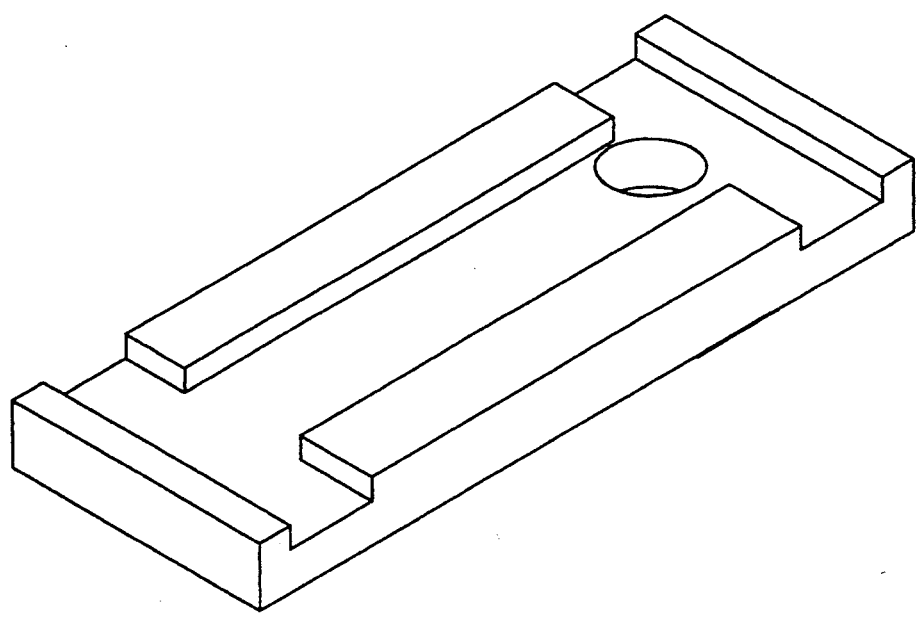
FIG. 4 is an isometric view of the lower side of the positioning plate shown in FIG. 2.

The device consists of two positioning plates 1, 10 and three hole forming implements 3, 5, 7 for making the hole in the plastic cassette shell. The positioning plates 1, 10 are formed so as to fit on the cassette in a specific and singular way providing accurate positioning for the hole forming implements which are pushed through the bushed holes.

The VHS-Hi8 positioning plate 1 which is used for a 8 mm cassette 12 or a VHS cassette 11 fits against VHS or 8 mm cassettes in separate singular and specific manners as follows:

On the lower side of the plate is a recessed area. This recessed area fits against a portion of the bottom side of the videocassette (this same bottom side is the side of the videocassette which is opposite the tape window).

The shoulder formed by the unrecessed area along the longer edge of the plate fits against the long "label" edge of the cassette (this is the cassette edge which is opposite the tape access door).

The shoulder formed by the other unrecessed area along the short edge of the plate fits against the shorter edge of the cassette on the rewind reel side.

On VHS cassettes, the nub created by the small remaining unrecessed area on the bottom of the plate 1 just fits into the molded in groove on VHS cassettes but does not reached the bottom of this groove.

On 8 mm cassettes the shoulder formed by the same nub fits against the shorter edge of the cassette on the take up reel side.

The VHS-C positioning plate 10 fits against a VHS-C cassette 13 in a singular and specific manner as follows;

On the lower side of the positioning plate is a recessed area. The unrecessed areas on this lower side form a rectangular frame which is sized to fit over the whole longer "label" edge of the VHS-C cassette so that the positioning plate 10 will remain in position relative to the cassette while the recessed area is held in contact with this same longer "label" edge.

The upper side of the positioning plate 10 bears markings which indicate which one of two possible ways the positioning plate should be oriented.

Fastened into the VHS- 8 mm positioning plate 1 shall be two identical bushings 2, 14 which are made of steel or other material which will resist cutting and wearing. The length through the bore of these same bushings shall be maintained in a specific relation to the length of the hole making implements 3, 5 which extends from their respective handles 4, 6. This specific relation is necessary to control the hole forming action of these same implements and shall be in concert with the method for forming the holes as described elsewhere in this description.

The various implements for making the hole includes the following:

a 5/32 inch diameter twist drill 5 with an attached handle 6 a 5/32 inch diameter round tapered and hardened steel point 3 with an attached handle 4 a ¼ inch diameter tubular tip 7 incorporated as a tip on a standard soldering iron 8.

The method of forming the hole which involves cutting out the plastic may be used for either the VHS format or the 8 mm format. The cutting method involves the use of the 5/32 inch diameter twist drill 5 with attached handle 6, hereafter referred to as the drill handle assembly 5, 8. The person operating the invention places the positioning plate 1 on the bottom of the cassette 11 or 12 as applicable. The twist drill 5 is placed in the bushing 2 or 14, as applicable, that is marked for the format being converted. The inscription 16 adjacent to the VHS bushing 2 reads "VHS TO SVHS". The inscription 15 adjacent to the 8 mm bushing 14 reads "8 mm to Hi8". While the cassette and positioning plate are held stationary with respect to each other the person operating the device pushes the drill handle assembly 5, 8 down into the cassette 11 or 12, as applicable, while slowly turning the drill handle assembly 5, 8. The force so introduced will cause the twist drill tip to cut into the plastic material which makes up the cassette shell. Subsequent to this the twist drill tip will go through the cassette shell. Carried by the twist drill flutes the body of the drill will start to enter the interior of the cassette. After the twist drill tip barely enters the cassette the handle 6 of the drill handle assembly 5, 6 will come to rest against the positioning plate bushing 2, 14. At this point the hole formed in the cassette is in the shape of the cross section of the twist drill. As the person operating the invention continues to turn the drill handle assembly 5, 6 the twist drill 5 is prevented from being drawn deeper into the cassette because the drill handle 6 will come to rest against the positioning plate bushing 2, 14 as applicable. As the person operating the invention continues to rotate the drill handle assembly 5, 6 the sharp edges of the drill flutes cut a round hole at the same time that they draw the cut out material up into positioning plate bushing 2, 14.

The exposed length of the 5/32" twist drill 5 and the length through the bore of the positioning plate bushings 2, 14 is such that the cuttings are all drawn away from the cassette and up into the positioning plate bushing bore. These same cuttings being held and adequately contained in the drill flute openings inside the bushing bore. The person operating the invention then withdraws the drill handle assembly 5, 6 from the positioning plate while continuing to hold the positioning plate and cassette together. The plastic cuttings are thereby drawn out of the bushing bore and safely away from the cassette.

The method of forming the hole which involves piercing the plastic cassette shell with the 5/32 inch diameter round hardened and polished tapered point 3, hereafter referred to as the tapered point, may be employed for forming the S-video ID hole in VHS cassettes. This piercing method is especially suited to forming the S-video ID hole in lightweight consumer grade videocassettes which are made out of soft, thin plastic. Aided by the specially formed surface of the positioning plate 1 described previously the person operating the invention positions the positioning plate 1 on the bottom side of the cassette 11. The tapered point 3 is placed in the bushing 2 bore adjacent to the inscription reading "VHS to SVHS" 16. The cassette and positioning plate are held stationary with respect to each other by the person operating the invention. The person operating the invention centers the tip of the tapered point 3 in the bushing 2 bore and then pushes the tapered point 3 down into the cassette while turning the tapered point handle slightly. The force so introduced will pierce the plastic material which makes up the cassette shell. The pliable nature of the cassette shell material will allow it to deform so that the S-video ID hole may be formed without creating any loose plastic debris. The length of the tapered point 3 and the length thru the bore of the positioning plate bushing 2 shall be such as to stop the penetration of the tapered point 3 into the cassette 11 at the proper depth. The shape and size of the tapered point shall be such as to form the hole required with the given amount of penetration. The tapered point 3 goes from a sharp point to its full diameter in ¾ inch of its length.

The method of forming the hole which involves melting the plastic cassette shell with the ¼ inch diameter tubular tip 7, hereafter referred to as the tubular tip, may be employed for forming the S-video ID hole in VHS-C (compact) cassettes thereby allowing SVHS-C VCRs and camcorders to record such cassettes in the S-video mode. This method is employed because the VHS-C cassette requires a larger hole and the area on the cassette where it must be formed is close to the tape and internal mechanisms of the cassette. The tubular tip 7 is attached to a soldering iron 8 in place of the soldering tip. The tubular tip is thus heated to approximately 600 degrees Fahrenheit by means of the soldering iron 8 which may be powered by any typical method. Aided by the specially formed surface of the positioning plate 10 the person operating the invention positions the positioning plate 10 on the front edge, this being the edge of the cassette opposite and parallel to the cassette door edge, of the cassette 13. The heated tubular tip 7 is placed in the bore of the heat insulating bushing 9 in the positioning plate 10. The insulating bushing 9 is typically made of ceramic material. The cassette 13 and positioning plate 10 are held stationary with respect to each other by the person operating the invention. Meanwhile the person operating the invention pushes the tubular tip 7 down into the cassette 13 while turning the tubular tip 7 and soldering iron 8 assembly slightly. The tubular tip 7 will melt through the plastic material which makes up the cassette shell. The depth of penetration of the tubular tip 7 into the cassette 13 is controlled by specifying the length of the tubular tip and the length through the bore of the heat insulating bushing. When the tubular tip 7 melts through the cassette wall the unmelted disk which is formed is reliably drawn up into the tubular tip 7 by cohesive capillary action. The tubular tip 7 is then withdrawn from the heat insulating bushing 9. A hole is thereby formed and the cutout material is safely removed from the cassette. A hole through the wall of the tubular tip 7 allows the introduction of a cleaning wire into the inside of the tubular tip 7 so that the unmelted disk can be pushed out of the tubular tip 7. The tubular tip 7 is just small enough to fit into the heat insulating bushing 9 in the positioning plate 10. The heat insulating bushing 9 in the positioning plate 10 fits tightly against the cassette 13 thereby preventing the melted material from flowing to the outside of the tubular tip 7.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method of forming an accurately located S-video record enable hole in VHS and 8 mm format videocassettes, comprising the steps of:

providing a drill template having at least one guide bushing and a drill bit having flutes and a handle;

placing the template on the videocassette;

moving the drill bit axially within the guide bushing with only a slight rotation to puncture a wall of the videocassette; and rotating the drill bit in the puncture such that the drill is drawn through the wall until the handle contacts the guide bushing, and then cutting out the hole with the drill bit so that debris will be drawn away from the videocassette.

2. The method of claim 1, further including the step of providing the template with a plurality of guide bushings corresponding to the locations of S-video record enable holes of a plurality of formats of videocassettes.

* * * * *